United States Patent
Mornet

(10) Patent No.: US 10,222,023 B2
(45) Date of Patent: Mar. 5, 2019

(54) LIGHTING MODULE COMPRISING AT LEAST ONE COMPONENT AND A CONNECTOR WHICH ARE DISPOSED ON A HEAT DISSIPATER, AND LIGHTING DEVICE FOR AUTOMOTIVE VEHICLE COMPRISING SUCH A MODULE

(71) Applicant: VALEO VISION, Bobigny (FR)

(72) Inventor: Eric Mornet, Nogent sur Marne (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/515,956

(22) PCT Filed: Sep. 25, 2015

(86) PCT No.: PCT/EP2015/072154
§ 371 (c)(1),
(2) Date: Mar. 30, 2017

(87) PCT Pub. No.: WO2016/050651
PCT Pub. Date: Apr. 7, 2016

(65) Prior Publication Data
US 2017/0299143 A1    Oct. 19, 2017

(30) Foreign Application Priority Data
Sep. 30, 2014  (FR) .................................. 14 59300

(51) Int. Cl.
*B60Q 1/00* (2006.01)
*B60Q 1/04* (2006.01)
(Continued)

(52) U.S. Cl.
CPC ............ *F21S 45/47* (2018.01); *B60Q 1/0088* (2013.01); *B60Q 1/04* (2013.01); *B60Q 1/2696* (2013.01);
(Continued)

(58) Field of Classification Search
CPC . F21S 45/47; F21S 45/48; F21S 45/49; F21V 23/06
See application file for complete search history.

(56) References Cited

U.S. PATENT DOCUMENTS 5,681,103 A * 10/1997 Remillard ............. F21V 14/006
362/551
2005/0024870 A1   2/2005 Coushaine
(Continued)

FOREIGN PATENT DOCUMENTS

| EP | 1 503 139 A2 | 2/2005 |
| EP | 1 503 139 A3 | 2/2005 |

(Continued)

OTHER PUBLICATIONS

International Search Report dated Dec. 7, 2015 in PCT/EP2015/072154 filed Sep. 25, 2015.
(Continued)

*Primary Examiner* — Alexander K Garlen
(74) *Attorney, Agent, or Firm* — Oblon, McClelland, Maier & Neustadt, L.L.P.

(57) ABSTRACT

A module comprising an electronic component and an electrical connector that are interconnected by a printed circuit board that is fastened to a heat sink, the connector includes a housing, connection contacts and a bundle of wires, which are secured to the housing and respectively interconnected electrically. The housing is arranged on one side of the board such that the contacts pass through the board so as to emerge onto the other side and to be connected electrically there. The board is fastened to the heat sink by the side thereof bearing the contacts. The surface of the heat sink receives the board having a boss at least level with the contacts, so as to avoid electrical contact between the contacts and the heat sink.

18 Claims, 4 Drawing Sheets

(51) Int. Cl.
*B60Q 1/26* (2006.01)
*F21K 9/00* (2016.01)
*F21S 41/19* (2018.01)
*F21S 41/39* (2018.01)
*F21S 43/14* (2018.01)
*F21S 43/37* (2018.01)
*F21S 45/47* (2018.01)
*F21V 23/06* (2006.01)
*F21V 29/74* (2015.01)
*F21S 41/141* (2018.01)
*F21Y 115/10* (2016.01)

(52) U.S. Cl.
CPC .............. *F21K 9/00* (2013.01); *F21S 41/141* (2018.01); *F21S 41/192* (2018.01); *F21S 41/39* (2018.01); *F21S 43/37* (2018.01); *F21V 23/06* (2013.01); *F21V 29/74* (2015.01); *F21S 43/14* (2018.01); *F21Y 2115/10* (2016.08)

(56) References Cited

U.S. PATENT DOCUMENTS

| | | | |
|---|---|---|---|
| 2005/0067931 A1* | 3/2005 | Coushaine | F21K 9/00 313/46 |
| 2006/0044840 A1* | 3/2006 | Watanabe | F21V 19/001 362/647 |
| 2006/0126328 A1 | 6/2006 | Coushaine | |
| 2006/0177193 A1* | 8/2006 | Coushaine | F21V 29/004 385/147 |
| 2006/0181864 A1 | 8/2006 | Coushaine et al. | |
| 2012/0007506 A1 | 1/2012 | Ohmi et al. | |
| 2012/0049736 A1 | 3/2012 | Shimizu et al. | |
| 2012/0201043 A1* | 8/2012 | DiPenti | F21S 48/321 362/545 |
| 2013/0163261 A1 | 6/2013 | Shimoji et al. | |
| 2013/0314934 A1 | 11/2013 | Ohmi et al. | |
| 2015/0323159 A1* | 11/2015 | Dinant | F21K 9/20 362/516 |
| 2016/0298818 A1* | 10/2016 | Duarte | H05K 1/0203 |

FOREIGN PATENT DOCUMENTS

| | | |
|---|---|---|
| EP | 1 674 786 A2 | 6/2006 |
| EP | 1 674 786 A3 | 6/2006 |
| EP | 2 423 573 A2 | 2/2012 |
| EP | 2 423 573 A3 | 2/2012 |
| EP | 2 607 783 A1 | 6/2013 |
| WO | 2011/078217 A1 | 6/2011 |

OTHER PUBLICATIONS

French Search Report dated Aug. 18, 2015 in FR 1459300 filed Sep. 30, 2014.

* cited by examiner

# LIGHTING MODULE COMPRISING AT LEAST ONE COMPONENT AND A CONNECTOR WHICH ARE DISPOSED ON A HEAT DISSIPATER, AND LIGHTING DEVICE FOR AUTOMOTIVE VEHICLE COMPRISING SUCH A MODULE

TECHNICAL FIELD OF THE INVENTION

The invention relates to a lighting module comprising at least one semiconductor component and one electrical connector that are mounted on an electrical interconnection element of the printed circuit board type, and connected to a heat sink.

The present invention is employed more particularly in the context of the mounting of a light source in a headlamp or a signal light for a motor vehicle.

TECHNICAL BACKGROUND OF THE INVENTION

In the field of motor vehicle lighting, when using light-emitting diodes (LEDs, which are semiconductor components) as a light source, it is known to connect these LEDs using an electrical interconnection element, for example of the printed circuit board (PCB) type, electrically connecting the LEDs and other components which may be mounted thereon, and then to arrange the LEDs and the PCB on a heat sink (typically a radiator), this heat sink then being mounted on a carrier, for example a headlamp reflector, in the headlamp or the light.

The electrical connection of the printed circuit board bearing the LEDs to the rest of the vehicle requires a connector to be mounted on the board, the connector ensuring the contact between the board and an electrical wire harness establishing the connection to the vehicle. To do this, it is conventional to use a two-part connector. More precisely, a first part of the connector (the female part) is first of all soldered to the printed circuit board; the board is then placed on the heat sink, which is then arranged on the carrier of the headlamp. Once the heat sink has been placed on its carrier, the electrical connection between the printed circuit board and the rest of the vehicle is established by joining the second part of the connector (the male part) to the first part, the second part of the connector being secured to the bundle of electrically connecting wires.

However, the above method of operation has the drawback of being expensive in that, on the one hand, the connection operations relating to the printed circuit board involve high temperatures that must be able to be withstood by the material forming the first part of the connector, i.e. the part fastened to the board, thus increasing the cost thereof. On the other hand, the mounting process is time-consuming and thus expensive in terms of labor, since once the heat sink has been placed on its lighting carrier, it is then necessary to connect the second part of the connector, i.e. the part connected to the electrical wire harness, to the first part of the connector, i.e. the part fastened to the printed circuit board, this taking place in a confined and thus difficult-to-access space between the carrier and the heat sink, which may prove difficult. Finally, this procedure requires tests to be carried out to check that the connection between the two parts of the connector has been established correctly, this being done using dedicated hardware, which is an additional cost-increasing factor.

BRIEF SUMMARY OF THE INVENTION

The invention aims to mitigate these drawbacks by providing a less costly solution, while at the same time enabling a satisfactory level of reliability and simple and thus quick assembly of the various elements of the lighting device.

To this end, one subject of the invention is a lighting module comprising at least one electronic component and an electrical connector, the component and the connector being interconnected by an electrical interconnection device, the interconnection device being fastened to a heat sink, the connector comprising electrical connection contacts,
the connector being arranged on one side of the interconnection device such that the contacts pass through the interconnection device so as to emerge onto another of its sides, where they are connected electrically to the interconnection device,
the interconnection device being fastened to the heat sink via the side onto which the contacts emerge,
the surface of the heat sink receiving the interconnection device having a cavity at least level with the contacts, so as to avoid electrical contact between the contacts and the heat sink.

In this way, in particular in the context of the specific application to the mounting of a light source in a motor vehicle headlamp, a person skilled in the art can use a single-part connector, comprising connection contacts and a bundle of electrically connecting wires that are interconnected inside the connector itself in a fastened and thus reliable manner, fasten said connector to an electrical interconnection device (for example a printed circuit board), and fasten the printed circuit board to the heat sink without the connection contacts posing any mechanical or electrical problems with the heat sink by virtue of the cavity, in order then to place the heat sink on a carrier in the headlamp. In this way, it is possible to dispense with the step of mounting the second part of the connector and then the step of testing the electrical connection between the two parts.

According to various embodiments of the invention, which will possibly be taken together or separately:
the electronic component is arranged on the heat sink and connected electrically to the interconnection device;
the electronic component is arranged on the interconnection device and connected electrically thereto;
the interconnection device makes thermal contact with the heat sink;
the cavity has a depth making it possible to leave a space between the contacts and the heat sink large enough to prevent electrical arcing between the contacts and the heat sink;
the electronic component comprises at least one semiconductor emitter chip, preferably a light-emitting diode;
the heat sink is substantially L-shaped;
the interconnection device is fastened to the heat sink via one of the arms of the L formed by the heat sink;
the heat sink comprises apertures;
the cavity of the heat sink is formed by embossing;
the cavity of the heat sink comprises holes for draining any accumulation of water;
the electrical connection between the contacts and the interconnection device is obtained by wave soldering or a pushed-in-type contact.

The invention also relates to a lighting device, in particular a lighting and/or signaling device for a motor vehicle, comprising such a module. According to various embodiments, which will possibly be taken together or separately:
the lighting device, in particular a lighting and/or signaling device for a motor vehicle, comprises a carrier and a module according to the invention, the latter being fastened to the carrier of the lighting device;
the module is fastened to the carrier via the heat sink;` the heat sink is fastened to the carrier via the other arm of the L;

the carrier is a reflector of the lighting device.

BRIEF DESCRIPTION OF THE FIGURES

Other features and advantages of the invention will emerge from the following detailed description, given by way of indication and illustrated by the appended drawings, in which.

DETAILED DESCRIPTION OF THE FIGURES

In the remainder of the description, elements having an identical structure or analogous functions are referenced using the same reference.

Figure 1:
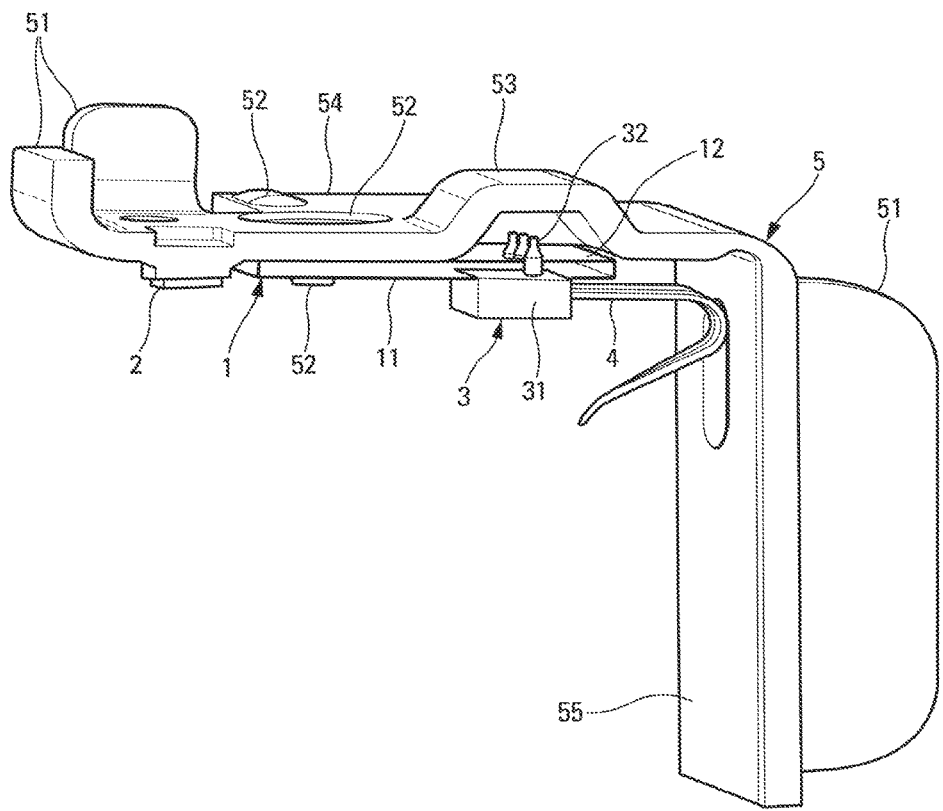
FIG. 1 shows a cross-sectional perspective view of one embodiment of the module according to the invention.
Figure 2:
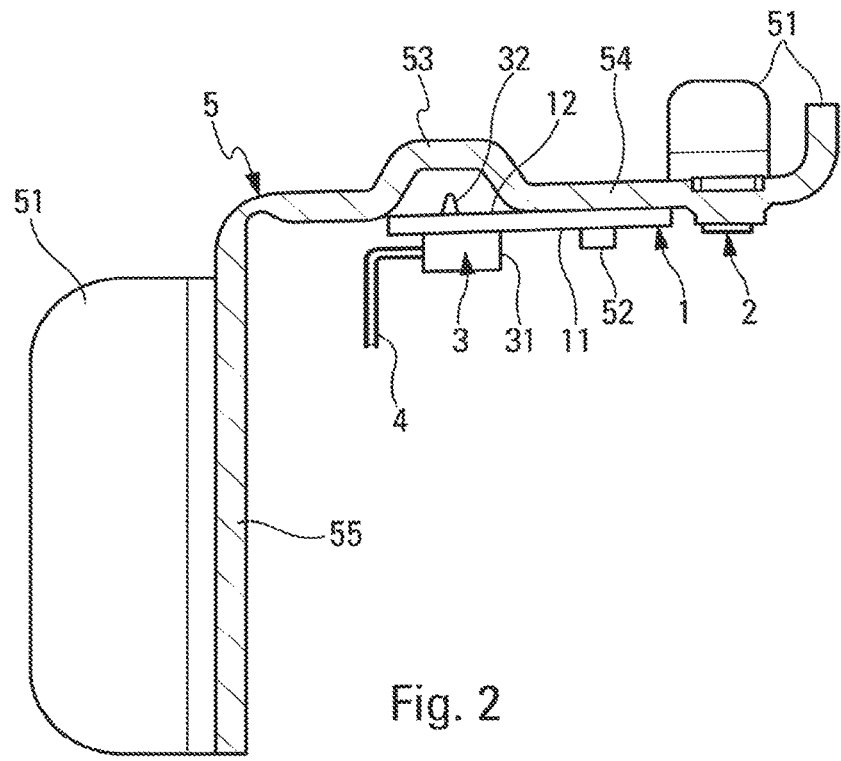
FIG. 2 shows a cross-sectional view of the module of FIG. 1.
Figure 3:
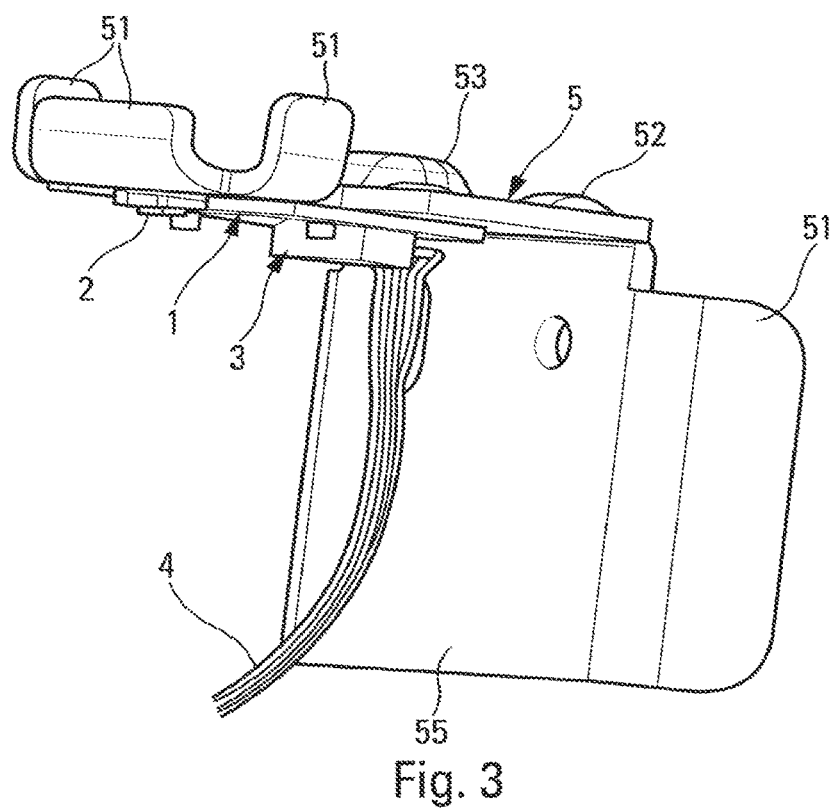
FIG. 3 shows a perspective view showing what is called the ventral side of the preceding module.

FIG. 1 shows the module according to the invention seen both in perspective and in cross section, FIG. 2 shows the same module seen only in cross section, and FIG. 3 shows the same module seen in perspective.

The device comprises an electrical interconnection element 1, for example of the printed circuit board or PCB type, fastened and/or interconnected to which are electronic components 2. These components comprise, for example, one or more semiconductor emitter chips, preferably light-emitting diodes in the case of an application to a lighting device, in particular a lighting and/or signaling device for a motor vehicle.

The printed circuit board 1 bears at least one connector 3, which is arranged on one side 11 of the board and intended to ensure the electrical connection between the board and a bundle of electrical wires 4, establishing the electrical connection with the rest of the vehicle.

In the embodiment shown, the connector 3 comprises a single housing 31, fastened to which are electrical contact-making means, such as connection contacts or pins 32, which protrude from the housing, and connecting wires 4. The wires 4 and the contacts 32 are fastened to the inside of the housing 31 and respectively interconnected electrically, that is to say one contact in principle to one single connecting wire.

The contacts 32 pass through the board 1 in order to be connected electrically to the circuits borne by the board on the other side 12 of the board, opposite the side 11 and termed the protrusion side. This connection to the board may be established for example by a wave soldering process, which will also ensure that the connector is held in position. The wave soldering is preferably selective, that is to say it concerns only a chosen area. The connection may also be established using a pushed-in-type contact.

The board 1 is fastened to a heat sink 5, intended to dissipate the heat produced by the electronic components 2. The board 1 preferably makes thermal contact with the heat sink 5. The heat sink 5 is made from a material that is a good thermal conductor, preferably inexpensive, not excessively heavy and easy to manufacture, such as a metal, preferably aluminum.

In the embodiment shown in the figures, at least one component 2 is fastened to the heat sink 5 itself, for example by adhesive bonding, the component being connected electrically to the board 1 by jumping, using electrical connecting wires, for example of metal (not shown). This embodiment makes it possible to optimize the cooling of the component 2. In one variant, the components 2 may be borne by the board 1 and for example be soldered.

With continuing reference to the example shown in the figures, the heat sink 5 has a substantially-shaped 'L' general shape, the board 1 being arranged on one of the arms 54 of the L, on what is called a ventral side, that is to say the side oriented toward the inside of the L. The other arm of the L is referenced 55. The heat sink is provided with fins 51 arranged at least on the arm 55 of the L and which, in the variant shown, on each arm of the L, facilitate heat dissipation. Said heat sink is also provided with various apertures or bosses, indiscriminately referenced 52, which are intended for fastening the board 1 to the heat sink and for the subsequent fastening of the heat sink 5, and/or intended to allow air to circulate.

According to the invention, the heat sink 5 also comprises a cavity 53, preferably a boss, which extends at least plumb with the contacts 32 of the connector 3 toward the dorsal or outer side of the L formed by the heat sink, so as to create a space between the contacts and the heat sink in order to house them, while avoiding any electrical contact between the contacts and the heat sink. Preferably, the boss 53 has a depth such that it leaves a space between the contacts and the heat sink large enough to prevent any risk of electrical arcing between these elements; a space of approximately one millimeter is suitable in motor vehicle lighting applications.

In this way, it is possible to use a single connector 3 provided with contacts that pass through the electronic board and are connected thereto by a process such as wave soldering, involving a temperature increase that remains moderate and allows the use of less expensive components and materials; this single connector is easy to use, reliable and does not require any subsequent step of testing the connection, as is the case for two-part connectors.

Such a configuration according to the invention also makes it possible to avoid the use of any adhesive between the heat sink 5 and the board 1, which adhesive would also be electrically insulating.

It will be noted that the electrical interconnection tracks borne by the board 1 will have to be arranged either on the side 11 thereof or on the side 12 thereof, plumb with the boss 53.

Figure 4:
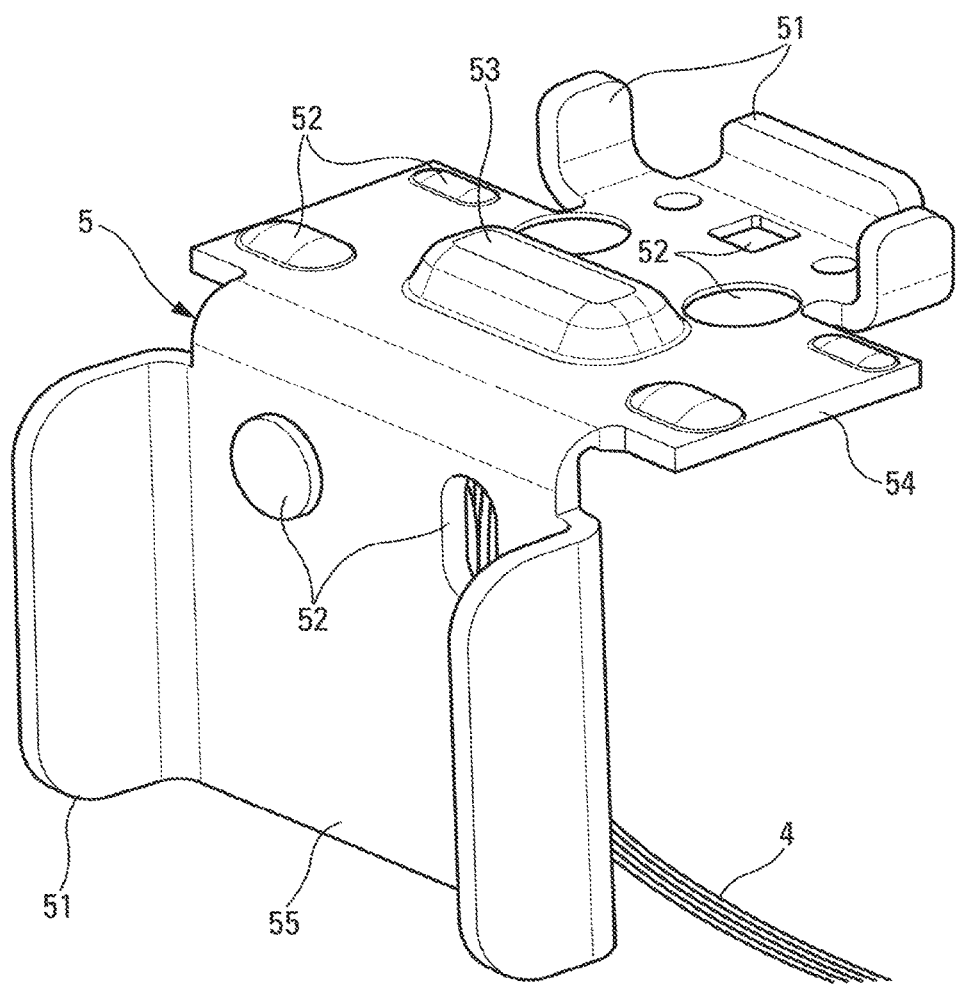
FIG. 4 shows a perspective view showing what is called the dorsal side of the previous module.

FIG. 4 shows another perspective view of the preceding module, in which view the dorsal sides of the heat sink 5, that is to say the sides thereof turned toward the outside of the L, may be seen.

In this figure, the L-shaped heat sink 5 may be seen. The various bosses and fastening apertures 52 have been shown on the dorsal side of the arm 54 of the L, as has the boss 53 located opposite the connection contacts of the connector 3 (not visible in this figure) and the bundle of connecting wires 4.

The arm 55 of the L has also been shown, for example provided with two connecting apertures 52 and two fins 51.

Figure 5:
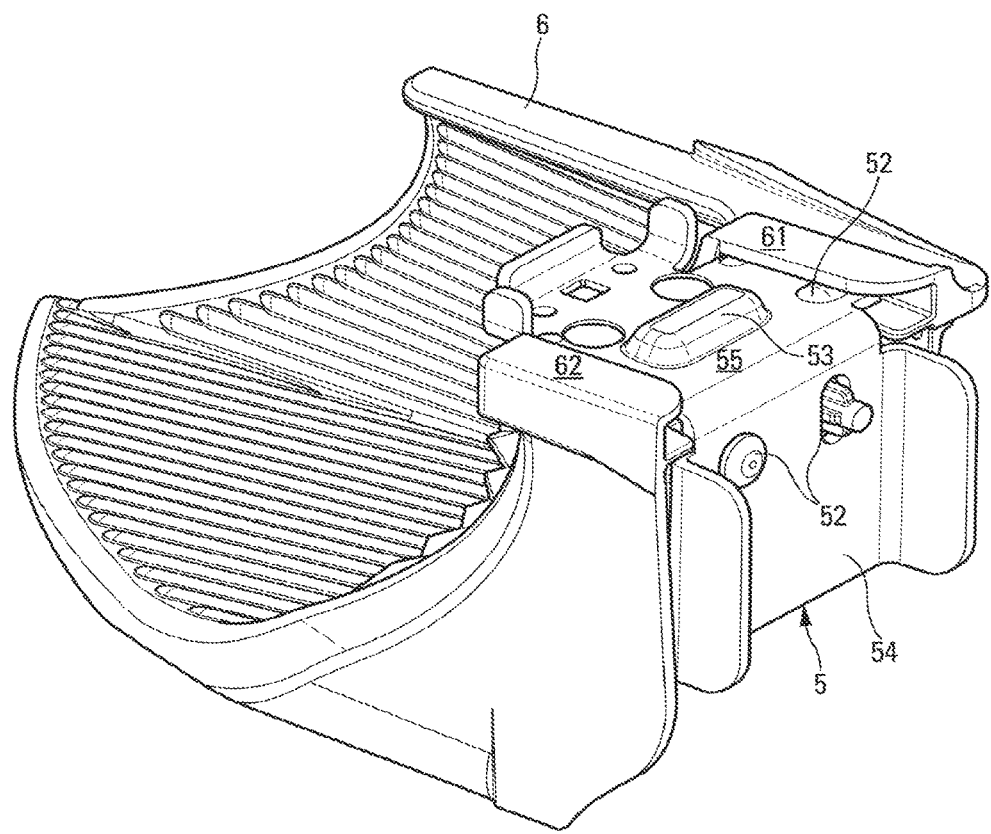
FIG. 5 shows a perspective view of the preceding module after it has been mounted on a carrier part of a lighting device, in particular a lighting and/or signaling device for a motor vehicle.

FIG. 5 is a perspective view of the device according to the invention after it has been mounted on a carrier part of a lighting device, for example the reflector of a motor vehicle headlamp.

In this figure, the heat sink 5 is shown in a view analogous to that in FIG. 4, mounted on a reflector 6 in partial view.

The upper part of the reflector 6 comprises, for example, two slide rails 61 and 62, into which the upper part of the arms 55 of the heat sink 5 which bears the light sources (not visible in the figure) is inserted, such that said light sources illuminate the inside of the reflector. A number of the bosses 52 enable the arm 55 of the heat sink 5 to be fastened to the slide rails 61, 62 of the reflector 6.

The heat sink may also be secured to the reflector 6 by way of its arm 54, the apertures 52 of which receive, for example, screwing means (threaded screws or rods, for example).

With mounting of this kind, the heat sink 5 and the elements borne thereby are fastened durably and reliably to the reflector 6, without the presence of the connector 3 or of the boss 53 impairing or preventing the fastening or significantly increasing the bulk of the assembly. The boss 53 furthermore constitutes mechanical protection for the contacts of the connector 3.

In one variant embodiment, depending on the final orientation of the headlamp into which the device according to the invention is inserted, it is possible to produce holes in the boss 53 in order to drain any accumulation of water if the boss is oriented downward. Nevertheless, these holes must remain small in order not to limit the thermal dissipation provided by the heat sink 5.

In another variant embodiment, the bundle of wires 4 may be replaced by a flexible printed circuit board, commonly referred to as a 'flex', on which the wires are replaced by printed conductive tracks.

The invention claimed is:

1. A lighting module comprising:
at least one electronic component including at least one semiconductor emitter chip and an electrical connector, the component and the connector being interconnected by an electrical interconnection device, the interconnection device and the at least one electronic component being fastened to a surface of a heat sink, wherein the connector comprises electrical connection contacts, the connector is arranged on one side of the interconnection device such that the contacts pass through the interconnection device so as to emerge onto another side of the interconnection device, where the contacts are connected electrically to the interconnection device, the connector is connected between the interconnection device and circuitry that projects out of the lighting module to establish an electrical connection with an apparatus external to the lighting module, the interconnection device is fastened to the heat sink via the another side onto which the contacts emerge, and the surface of the heat sink that receives the interconnection device has a cavity at least level with the contacts, so as to avoid electrical contact between the contacts and the heat sink.

2. The module according to claim 1, wherein the electronic component is arranged on the heat sink and is connected electrically to the interconnection device.

3. The module according to claim 1, wherein the electronic component is arranged on the interconnection device and connected electrically thereto.

4. The module according to claim 1, wherein the interconnection device makes thermal contact with the heat sink.

5. The module according to claim 1, wherein the cavity has a depth making it possible to leave a space between the contacts and the heat sink large enough to prevent electrical arcing between the contacts and the heat sink.

6. The module according to claim 1, wherein the heat sink is substantially L-shaped.

7. The module according to claim 6, wherein the interconnection device is fastened to the heat sink via one of arms of the L formed by the heat sink.

8. The module according to claim 1, wherein the cavity of the heat sink is formed by embossing.

9. The module according to claim 1, wherein the cavity of the heat sink comprises holes to drain any accumulation of water.

10. The module according to claim 1, wherein an electrical connection between the contacts and the interconnection device is obtained by wave soldering or a pushed-in-type contact.

11. A lighting and/or signaling device for a motor vehicle, wherein the lighting and/or signaling device comprises a carrier and the module according to claim 1, the module being fastened to the carrier of said lighting and/or signaling device.

12. The lighting and/or signaling device according to claim 11, wherein the module is fastened to the carrier via the heat sink.

13. The lighting and/or signaling device according to claim 11, wherein, the heat sink is fastened to the carrier via one of arms of an L formed by the heat sink.

14. The lighting and/or signaling device according to claim 11, wherein the carrier is a reflector of said lighting and/or signaling device.

15. The module according to claim 3, wherein the interconnection device makes thermal contact with the heat sink.

16. The module according to claim 4, wherein the cavity has a depth making it possible to leave a space between the contacts and the heat sink large enough to prevent electrical arcing between the contacts and the heat sink.

17. The module according to claim 7, wherein the cavity of the heat sink is formed by embossing.

18. The module according to claim 1, wherein the cavity is an empty air space.

* * * * *